US011301392B2

(12) United States Patent
Chatterjee et al.

(10) Patent No.: US 11,301,392 B2
(45) Date of Patent: *Apr. 12, 2022

(54) ADDRESS TRANSLATION CACHE INVALIDATION IN A MICROPROCESSOR

(71) Applicant: International Business Machines Corporation, Armonk, NY (US)

(72) Inventors: Debapriya Chatterjee, Austin, TX (US); Bryant Cockcroft, Austin, TX (US); Larry Leitner, Austin, TX (US); John A. Schumann, Austin, TX (US); Karen Yokum, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/063,888

(22) Filed: Oct. 6, 2020

(65) Prior Publication Data

US 2021/0019262 A1 Jan. 21, 2021

Related U.S. Application Data

(63) Continuation of application No. 16/417,961, filed on May 21, 2019, now Pat. No. 10,915,456.

(51) Int. Cl.
*G06F 12/10* (2016.01)
*G06F 12/02* (2006.01)
(Continued)

(52) U.S. Cl.
CPC .......... *G06F 12/10* (2013.01); *G06F 12/0284* (2013.01); *G06F 12/0292* (2013.01);
(Continued)

(58) Field of Classification Search
CPC ............... G06F 12/10; G06F 2212/657; G06F 12/0284; G06F 12/0292; G06F 12/1027; G06F 12/1036; G06F 12/109
See application file for complete search history.

(56) References Cited

U.S. PATENT DOCUMENTS 6,044,447 A 3/2000 Averill et al.
8,356,151 B2 1/2013 Arimilli et al.
(Continued)

OTHER PUBLICATIONS

International Search Report dated Aug. 6, 2020, issued in PCT/IB2020/054031, 9 pages.
(Continued)

*Primary Examiner* — Tasnima Matin
(74) *Attorney, Agent, or Firm* — Scully, Scott, Murphy & Presser, P. C.

(57) ABSTRACT

A method and an information handling system having a plurality of processors connected by a cross-processor network, where each of the plurality of processors preferably has a filter construct having an outgoing filter list that identifies logical partition identifications (LPIDs) that are exclusively assigned to that processor and/or an incoming filter list that identifies LPIDs on that processor and at least one additional processor in the system. In operation, if the LPID of the outgoing translation invalidation instruction is on the outgoing filter list, the address translation invalidation instruction is acknowledged on behalf of the system. If the LPID of the incoming invalidation instruction does not match any LPID on the incoming filter list, then the translation invalidation instruction is acknowledged, and if the LPID of the incoming invalidation instruction matches any LPID on the incoming filter list, then the invalidation instruction is sent into the respective processor.

20 Claims, 5 Drawing Sheets

(51) Int. Cl.
*G06F 12/109* (2016.01)
*G06F 12/1036* (2016.01)

(52) U.S. Cl.
CPC ........ *G06F 12/109* (2013.01); *G06F 12/1036* (2013.01); *G06F 2212/657* (2013.01)

(56) References Cited

U.S. PATENT DOCUMENTS

| | | |
|---|---|---|
| 9,086,987 B2 | 7/2015 | Cain, III et al. |
| 9,251,088 B2 | 2/2016 | Frey et al. |
| 9,928,119 B2 | 3/2018 | Guthrie et al. |
| 2005/0027960 A1* | 2/2005 | DeMent .............. G06F 12/1036 711/207 |
| 2005/0273575 A1 | 8/2005 | Mukherjee |
| 2008/0114942 A1 | 5/2008 | Brown et al. |
| 2015/0301950 A1* | 10/2015 | Bybell .................. G06F 9/5077 711/207 |
| 2018/0357178 A1 | 12/2018 | Mathewson et al. |

OTHER PUBLICATIONS

List of IBM Patents or Patent Applications Treated as Related, dated Oct. 6, 2020, 2 pages.

* cited by examiner

ADDRESS TRANSLATION CACHE INVALIDATION IN A MICROPROCESSOR

BACKGROUND

This disclosure herein relates generally to processors, and more particularly, to methods and systems to change or remove address translations within an information handling system, including the processing of address translation invalidation instructions in a system with a plurality of processors.

A conventional computer typically includes multiple processors capable of storing various types of data, such as data used to translate virtual addresses to physical addresses. The data may be widely distributed and stored on various processors throughout the system. To improve virtual memory translation performance most modern microprocessors deploy some form of address translation cache or buffer. The most common hardware construct for memory translation is the translation look-aside buffer (TLB). When address translation of a virtual page is changed or removed, e.g., due to a page remapping or page replacement, the cache or buffer entry containing the address translation should be removed as well. In most modern microprocessors this process is software controlled and is performed by the address translation buffer invalidate instruction. The computer may incur a decrease in performance if a processor needs to invalidate address translation information across a processor network system. That is, the latency in processing the address translation buffer invalidate instruction increases when the processor needs to undergo an invalidation procedure involving numerous processors in a network. The execution performance (throughput rate and average latency) of the address translation buffer invalidate instruction in large symmetric multi-processor (SMP) configurations can be a system bottleneck.

SUMMARY

The summary of the disclosure is given to aid understanding of a computer system, computer architectural structure, processor, and method of removing and/or changing address translations in an address translation cache/buffer within a system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. As such, variations and modifications may be made to the computer system, the architectural structure, processor, and their method of operation to achieve different effects.

In one or more embodiments, an information handling system having a plurality of processors connected by a cross-processor network is disclosed where each of the plurality of processors include one or more address translation buffers, each address translation buffer having a plurality of address translation entries containing address translation information; a filter construct having an outgoing filter list that identifies logical partition identifications (LPIDs) that are exclusively assigned to that processor. In one or more embodiments the system in operation is designed and configured to: issue an address translation invalidation instruction having a LPID in one of the plurality of processors in the processing system; check the outgoing filter list in the processor where the address translation invalidation instruction issued; determine whether the LPID of the address translation invalidation instruction matches any of the LPIDs in the outgoing filter list; and acknowledge, in at least partial response to the LPID of the address translation invalidation instruction matching any of the LPIDs in the outgoing filter list, the translation instruction invalidation instruction on behalf of the system.

In one or more embodiments, an information handling system having a plurality of processors connected by a cross-processor network is disclosed, where each of the plurality of processors includes one or more address translation buffers, each address translation buffer having a plurality of entries containing address translation information; and a filter construct having an incoming filter that identifies logical partition identifications (LPIDs) assigned to that processor and at least one other processor in the system. The system in operation is designed and configured in an embodiment to: issue an address translation invalidation instruction in one of the plurality of processors in the processing system; send the address translation invalidation instruction out of the processor where the address translation invalidation instruction issued to the other processors in the system; determine, for each of the processors in the system other than the processor where the address translation invalidation instruction issued, whether the LPID of the address translation invalidation instruction matches any of the LPIDs in the respective processor incoming filter list; and send, in response to the LPID of the address translation invalidation instruction matching any of the LPIDs in the incoming filter list, the address translation invalidation instruction into the processor that has the incoming filter with the LPID that matches the LPID on the incoming filter list. The system in operation is further designed and configured in an aspect to: check, within the translation buffers in the processor where the LPID of the address translation invalidation instruction matches a LPID on the incoming filter, for address translation entries that correspond to the address translation invalidation instruction; and acknowledge, in response to completing the check within each processor that has a LPID in their incoming filter that matches the LPID of the address translation invalidation instruction, the address translation invalidation instruction on behalf of the respective processor. The system in operation is further designed and configured in an embodiment to acknowledge, in response to the LPID of the address translation invalidation instruction not matching any of the LPIDs in the incoming filter list, the address translation invalidation instruction on behalf of the respective processor.

According to one or more embodiments, an information handling system having a plurality of processors connected by a cross-processor network is disclosed where each of the plurality of processors includes one or more address translation buffers, each address translation buffer having a plurality of address translation entries containing address translation information; and a filter construct having an outgoing filter list that identifies logical partition identifications (LPIDs) that are exclusively assigned to that processor, and the system includes one or more computer readable storage media; and programing instructions stored on the one or more computer readable storage media for execution by at least one of the plurality of processors, the program instructions in operation cause the system to: issue an address translation invalidation instruction having a LPID in one of the plurality of processors in the processing system; check the outgoing filter list in the processor where the address translation invalidation instruction issued; determine whether the LPID of the address translation invalidation instruction matches any of the LPIDs in the outgoing filter list; and acknowledge, in at least partial response to the LPID of the address translation invalidation instruction matching any of the LPIDs in the outgoing filter list, the translation instruction invalidation instruction on behalf of the system. The system in an embodiment has further programming instructions that in operation cause the system to check within the one or more address translation buffers in the processor where the address translation invalidation instruction issues for address translation entries that correspond to the address translation invalidation instruction. The system in operation is further designed and configured to: send, in response to the LPID of the address translation invalidation instruction not matching any of the LPIDs in the outgoing filter, the address translation invalidation instruction out of the processor where the address translation invalidation instruction issued; and circulate the address translation invalidation instruction on the cross-processor network to the other processors in the system other than the processor where the address translation invalidation instruction issued.

An information handling system having a plurality of processors connected by a cross-processor network is disclosed where each of the plurality of processors includes one or more address translation buffers, each address translation buffer having a plurality of entries containing address translation information; and a filter construct having an incoming filter that identifies logical partition identifications (LPIDs) assigned to that processor and at least one other processor in the system. The system in operation in an aspect is designed and configured to: issue an address translation invalidation instruction in one of the plurality of processors in the processing system; send the address translation invalidation instruction out of the processor where the address translation invalidation instruction issued to the other processors in the system; determine, for each of the processors in the system other than the processor where the address translation invalidation instruction issued, whether the LPID of the address translation invalidation instruction matches any of the LPIDs in the respective processor incoming filter list; and acknowledge, in response to the LPID of the address translation invalidation instruction not matching any of the LPIDs in the incoming filter list, the address translation invalidation instruction on behalf of the respective processor.

The foregoing and other objects, features and advantages of the invention will be apparent from the following more particular descriptions of illustrative embodiments of the invention as illustrated in the accompanying drawings wherein like reference numbers generally represent like parts of exemplary embodiments of the invention. The invention, however, should not be limited to these illustrative examples.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, assemblies, subassemblies, systems, features, aspects, embodiments, methods, processes, or devices shown, and the arrangements, structures, assemblies, subassemblies, systems, features, aspects, methods, processes, embodiments, and devices shown may be used singularly or in combination with other arrangements, structures, assemblies, subassemblies, systems, features, aspects, embodiments, methods, processes, and devices.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the embodiments, arrangements, assemblies, subassemblies, systems, features, processes, methods, aspects, devices, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information handling systems, including processors and microprocessor systems and architectures, which are apparent to those skilled in the art. It is assumed that those skilled in the art are familiar with the general architecture of processors, and in particular, with processor networks including large symmetrical multi-processor (SMP) configurations that usually have several smaller chip multi-processors (CMP) where each such chip multiprocessor, e.g., CMP, can contain up to hundreds of processor cores and accelerator units deploying translation caches, connected via an on-chip network fabric. It may be noted that a numbered element is numbered according to the figure in which the element is introduced, and is typically referred to by that number throughout succeeding figures.

Complex computer systems, e.g., large symmetric multiprocessor (SMP) configurations, usually have several smaller chip multi-processors (CMPs). Each chip multiprocessor (CMP) can contain hundreds of processors and other accelerators deploying translation caches, connected via an on-chip network fabric. Usually the CMPs are connected by a cross-chip network using off-chip links or network adapters to form the large SMP. In one or more embodiments, to reduce latency and increase performance and through-put a TLBie filter is included, preferably a hardware TLBie filter preferably present in the cross-chip network adapter. In one or more embodiments, the TLBie filter is used with a protocol to be followed when creating, removing and/or reassigning a partition to a hardware thread. In an embodiment, the TLBie filter includes an outgoing filter list that maintains logical partition identifications (LPIDs) for all logical partitions inside that CMP and no other CMPs in the system. In an embodiment, the TLBie filter includes an incoming filter list that tracks all LPIDs that exist across multiple CMPs, and at least one thread or accelerator content from this hosting CMP belongs to that partition. By using the outgoing TLBie filter list and the incoming TLBie filter list, performance is increased as each CMP does not need to be searched for translations to be removed and invalidated.

Figure 1:
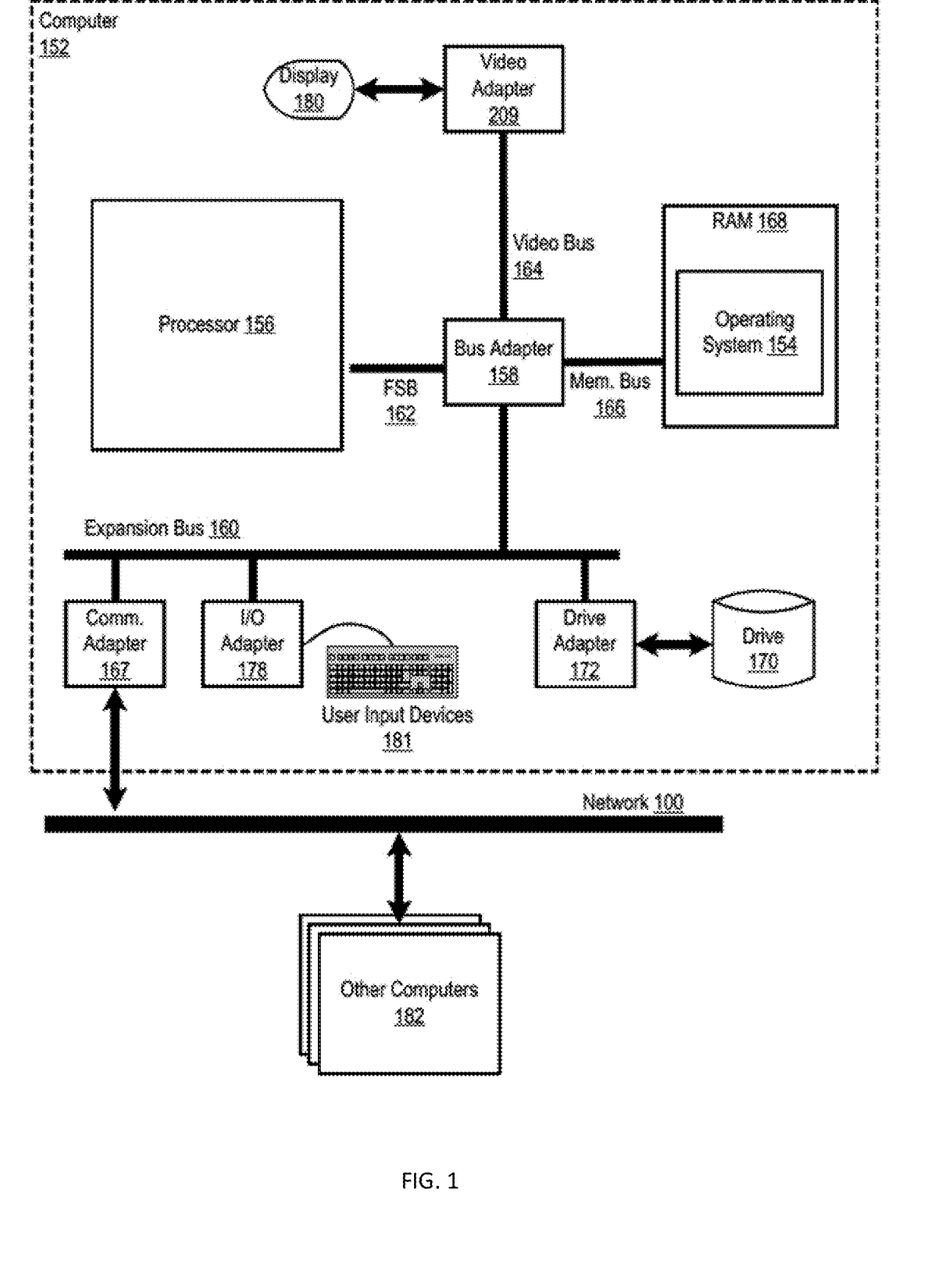
FIG. 1 is a functional block diagram illustrating a computer system, according to one or more embodiments of the present disclosure.

FIG. 1 is a functional block diagram illustrating a computer system 10. The system 10 includes an example of automated computing machinery in the form of a computer 152.

Figure 2:
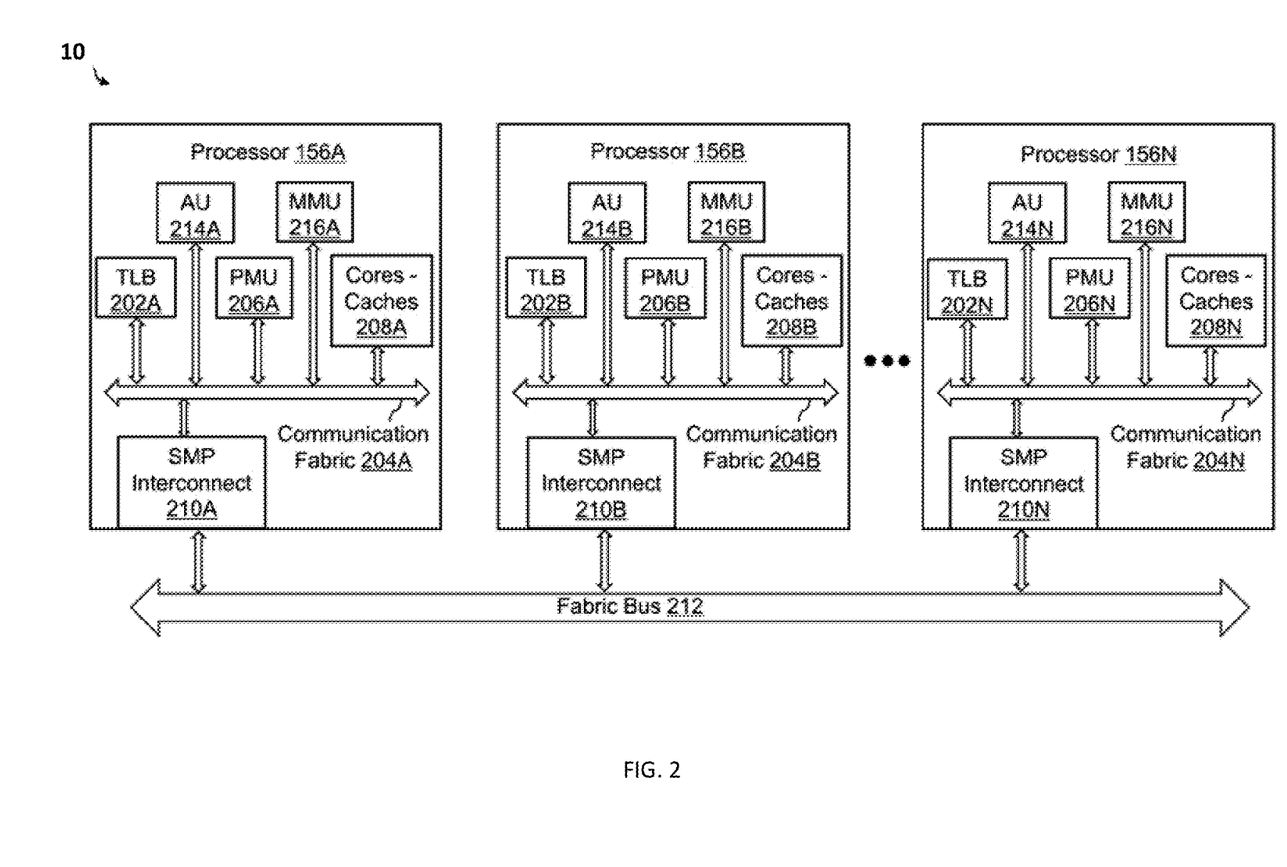
FIG. 2 is a functional block diagram illustrating a system configured to process instructions, according to one or more embodiments of the present disclosure.

The computer 152 may include a processor 156 or central processing unit ("CPU") as well as random access memory 168 ("RAM"), which is connected via a high speed memory bus 166 and bus adapter 158 to the processor 156 and to other components of the computer 152. For simplicity, FIG. 1 illustrates only one processor 156 included with the computer 152; however, it is noted that computer 152 may include more than one processor, for example, processor 156A, processor 156B, through processor 156N (where N can be any number), as illustrated in FIG. 2. It is noted that processor 156A, processor 156B, through processor 156N each include one or more aspects of processor 156. In some embodiments, RAM 168 may be an embedded dynamic random access memory (eDRAM). In some embodiments, RAM 168 may be utilized by units, such as processing cores, on the processor 156, via the front side bus 162 and/or the fabric bus 212.

The processor 156 may be implemented as a multi-slice processor. The term "multi-slice" may refer to a processor having a plurality of similar or identical sets of components, in which each set of components may operate independently of all the other sets or in concert with the one or more of the other sets.

Although the processor 156 is shown to be coupled to RAM 168 through the front side bus 162, the bus adapter 158, and the high speed memory bus 166, those of ordinary skill in the art will recognize that such configuration is only an example implementation and other configurations of coupling the processor 156 to other components of the system 10 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 and the data processing application being located in RAM 168, other components of such software may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 100. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

FIG. 2 is a functional block diagram illustrating SMP 10, represented as multiple processors, also referred to as chip multi-processors (CMPs), 156A, 156B, through 156N (where N can be any number), configured to process instructions, and in particular, to practice embodiments of the disclosure that remove address translations from caches within a computer system to improve performance. For purpose of clarity, the embodiments of the disclosure illustrated in FIG. 2 are described with respect to the processor (CMP) 156A. However, this discussion is not intended to be limiting or restrictive to only the features of processor (CMP) 156A and its respective functional units; but rather, all or some features and/or functional units of processor (CMP) 156A may be equally applicable to processor (CMP) 156B through processor (CMP) 156N, and their respective functional units. For example, the features of communication fabric 204A may be included in each of communication fabric 204B through communication fabric 204N.

In one or more embodiments, processor (CMP) 156A includes functional units, such as, a translation lookaside buffer ("TLB") 202A, a performance management unit ("PMU") 206A, one or more cores and/or caches 208A, a symmetric multiprocessing ("SMP") interconnect 210A (also referred to as cross-chip network adapter 210A), an accelerator unit ("AU") 214A, and a memory management unit ("MMU") 216A, each being coupled to communication fabric 204A. In one or more embodiments, the processor (CMP) 156A also includes a segment lookaside buffer ("SLB") (not shown) and/or an in use scoreboard ("IUSB") (not shown). The communication fabric 204A, also referred to as CMP fabric 204A, is configured to transmit messages, e.g., signals, information, etc., between the units, connectors, and storage on processor (CMP) 156A. In one or more embodiments, the TLB 202A, the PMU 206A, the one or more cores and/or caches 208A, the SMP interconnect 210A, the communication (CMP) fabric 204A, the AU 214A, and the MMU 216A are implemented on the same semiconducting die or on multiple interconnected dies. In one or more aspects, the SLB and the IUSB are coupled to the one or more other functional units of the processor (CMP) 156A via the communication (CMP) fabric 204A. In one or more aspects, the SLB and the IUSB are implemented with the one or more other functional units on the same semiconducting die or on multiple interconnected dies.

The SMP interconnect 210A, also referred to as a cross-processor/chip link adapter or cross-processor/chip network adapter 210A, is configured to allow additional processors, such as processors (CMPs) 156B through 156N, to be connected to processor (CMP) 156A, thus increasing computational power. The SMP link or interconnect 210A, in an embodiment, connects processor (CMP) 156A to the processors (CMPs) 156B through 156N via a fabric bus or cross-processor/chip network 212. The fabric bus 212 connection may include a higher bandwidth and provide lower latency. The fabric bus or cross-processor/chip network 212 may allow cache coherence traffic and data traffic to flow over a different network connection. In one or more embodiments, the fabric bus or cross-processor (cross-chip) network 212 may be any type of communication fabric and/or any combination of connections and protocols that allow communication between processors (CMPs), e.g., processors 156A, 156B, through 156N. For example, the fabric bus 212 may be a bus or links (e.g., cross-links) that interconnects processors (CMPs) 156A, 156B, through 156N.

The communication (CMP) fabric 204A may be any type of communication fabric known to one of ordinary skill in the art that allows communication between the various units, memory, and interconnects in processor (CMP) 156A. The communication CMP fabric 204A may also be an out-of-order on-chip bus, in which the transactions (e.g., checkin request/response transactions, checkout request/response transactions, and invalidate transactions) are transmitted as packets on the out-of-order on-chip bus. In one or more embodiments, the one or more cores and/or caches 208A may include one or more processor cores and their level one ("L1") cache, level two ("L2") cache, and/or last level cache ("LLC") on processor (CMP) 156A. The L1 cache, L2 cache, and LLC may be arranged in an arbitrary configuration. For example, the L1 cache may be a split instruction and data cache, the L2 cache may be a shared cache, and the LLC may be a private cache. In another example, the L1 cache may include L1 Instruction and Data caches that are private, the L2 cache may be private or is shared with another core, and the LLC may be a private or shared cache. The one or more processor cores are configured to read and execute program instructions.

The PMU 206A may be configured to analyze the performance of the processor (CMP) 156A and the storage of the processor or CMP 156A. For example, the PMU 206A may analyze the number of clock cycles and/or cache hits and cache misses.

In one or more embodiments, the processor (CMP) 156A includes at least one memory management unit (MMU) 216A, an accelerator unit (AU) 214A, and a direct memory access (DMA) controller (not shown). In one or more embodiments, the MMU 216A is a unit on processor (CMP) 156A that manages memory including facilitating access to the memory by providing address translation. The AU 214A is configured to provide an interface between external processing elements and the elements within the processor (CMP) 156A, including providing access to locations in RAM 168 on the computer 152, the cores and/or caches 208A on the processor (CMP) 156A, or other memory locations in or connected to the computer 152. In some embodiments, the AU 214A may include coherent accelerator processor interfaces, graphic acceleration interfaces, cryptographic interfaces, and streaming interfaces. The AU 214A of the processor (CMP) 156A may be specialized hardware that can perform specific compute functions, such as encryption, decryption, compression, or decompression. The MMU 216A may make requests to the cores and/or caches 208A on behalf of the AU 214A. That is, the MMU 216A may perform memory moves on behalf of AU 202A.

Address translation in a computer system typically incorporates accessing various address translation data structures. One such structure referred to as a page table includes multiple entries referred to as Page Table Entries (PTEs) that map virtualized addresses on a page-by-page basis. The page table is typically stored in main memory, rather than dedicated memory, which makes accessing the page table slow. To accelerate address translation, high-speed memories referred to as address translation buffers, e.g., TLBs, SLBs, and/or IUSBs, are typically used to store recently used address translations in cache/buffer entries for quick access.

A TLB may be a cache of virtual addresses mapped to real addresses stored in TLB entries. Each TLB entry may be associated with a TLB index, which identifies the TLB (or a page table entry (PTE)) entry within the TLB. For example, a TLB index of 4 may refer to the fourth (or fifth) entry in the TLB. A variety of indexing schemes, known to those of ordinary skill in the art, may be used for TLB indexes. The SLB may be a cache of effective segment identifiers (ESID) mapped to virtual segment identifiers (VSID) stored in SLB entries. Each SLB entry is associated with an SLB index, which identifies the SLB entry within the SLB. For example, a SLB index of 4 may refer to the fourth (or fifth) entry in the SLB. A variety of indexing schemes, known to those of ordinary skill in the art, may be used for SLB indexes. The IUSB (not shown) may be a data structure that stores ERAT indexes mapped to TLB indexes and, if applicable, SLB indexes. The IUSB tracks which entries in the SLB and the TLB store translations that have been utilized to generate translations are currently stored in one or more caches of processor (CMP) 156A.

To improve address translation, the MMU 216A utilizes TLB 202A. TLB 202A is a cache of Effective Address to Real Address (RA) mappings received from the MMU 216A. The Effective Address (EA) is a virtual address used by elements and processes in the system 10 to refer to memory locations. The Real Address (RA) is a physical address. During operation of the processor (CMP) 156A, the EA must be translated into the RA in order for the processor (CMP) 156A to access the requested data. When a request is received for a memory access that includes an address to be translated, typically the TLB 202 in that processor (CMP) 156 is checked first. If the address is cached in that TLB 202, then the address translation is provided to that processor (CMP) 156. If the address is not in the TLB 202 of that processor, then the translation is translated using other techniques, e.g., for example, a table walk.

When an address translation, e.g., an address mapping, in an address translation buffer 202 (e.g., TLB 202) or page table is no longer valid, the system will undergo an invalidation process. Typically, an address translation invalidation entry instruction, e.g., a TLB invalidate entry (TLBie) instruction, is broadcast throughout the system, address translation buffers/caches are located, and each entry in the translation buffers 202, e.g. TLBS, are searched to determine whether they have an entry that matches the entry to be invalidated. The translation buffer invalidation, e.g., TLBie, instruction locates storage (memory) locations where address translations are mapped, which is indicative of data associated with the processor (CMP) 156.

More specifically, in an embodiment of a system configured as a SMP, whenever any execution thread on any processor core issues a translation buffer (e.g., TLB) invalidate entry (TLBie) instruction, typically the corresponding control packet is broadcast across the entire system over the fabric bus 212 to each processor (CMP) 156. Each processor (CMP) 156 in an aspect receives this packet on their SMP network adapter 210 (also referred to as cross-chip link adapter) for the SMP network and broadcasts within the processor (CMP) 156 via the communication (CMP) fabric 204 to its constituent processor cores 208 and/or accelerator units 214. When every processor core 208 and accelerator unit 214 in the processor (CMP) 156 has acknowledged the incoming snoop TLBie, it can be acknowledged by that processor (CMP) 156. When every processor (CMP) 156A through 156N in the whole SMP system 10 has acknowledged the TLBie, then the TLBie instruction can be completed at its execution thread. This broadcasting of the TLBie instruction in each processor (CMP) and throughout the SMP system can cause poor throughput and latency of TLBie instructions since both the control message and the acknowledge message traverses across each processor (CMP) 156 and across the entire SMP system 10.

Disclosed is a system and/or process to reduce processing effort of removing address translations from translation buffers and/or processing translation buffer invalidation entry instructions in a computer network system, preferably a SMP network system, which results in higher throughput and less latency in removing address translations from buffers and/or processing translation invalidation entry instructions. In an embodiment, a filter construct is used as a building block to improve processing of the address translation buffer invalidation instruction. The translation buffer filter construct, e.g., TLBie filter construct, in an aspect is used with a logical partition aware system scope scheme managed by hypervisor software. That is, the system is aware of which logical partition identifications (LPIDs) are assigned to which processors (CMPs) in the system. The filter hardware, in an embodiment, is a directory structure that preferably is software managed. The filter hardware structure preferably is present in the cross-processor network adapter (SMP interconnect), also referred to as a cross-chip network adapter. In an embodiment, the filter works in association with a protocol to be followed by the hypervisor software when spawning (assigning), removing, and/or re-assigning a logical partition (LPID) to a hardware thread. In an embodiment, the process and/or system is cooperative using both the hardware structure as well as software management, preferably at the hypervisor.

If all threads of a logical partition are contained within a processor (CMP), then in one or more embodiments, the address translation invalidation instruction for that logical partition identification (LPID) does not have to be sent out or processed outside of that processor (CMP). An outgoing filter list in one or more embodiments is used in one or more embodiments that identifies and/or maintains a list of logical partition identifications (LPIDS) that are exclusive to that processor (CMP). That is, the outgoing filter list identifies all logical partitions that are on that processor and only that processor. If a logical partition is also assigned to another processor in the system, that logical partition identification (LPID) will not be listed on the outgoing filter list for that processor.

If the threads of a logical partition are distributed across multiple processors (CMPs), then only the processors (CMPs) containing threads for that logical partition need to process a translation invalidation for that logical partition identification (LPID). An incoming filter list maintaining a list of eligible LPIDs assigned to that processor (CMP) as well as at least one other processor in the system can be used to determine whether that processor (CMP) has that LPID. The incoming filter list tracks all LPIDs that exist across multiple processors and at least one thread or accelerator context from the processor hosting the incoming filter list belongs to that partition.

These outgoing filter and/or incoming filter lists, preferably when working in tandem for all logical partitions that exist in the system, will reduce the processing time of address translation invalidation instructions as in one or more embodiments only the processors (CMPs) that need to process that translation invalidation instruction perform the processing. In one or more embodiments, the software protocol that is implemented by the hypervisor software keeps the hardware filter structures updated for correct execution of the address translation invalidation instructions across the SMP system.

Figure 3:
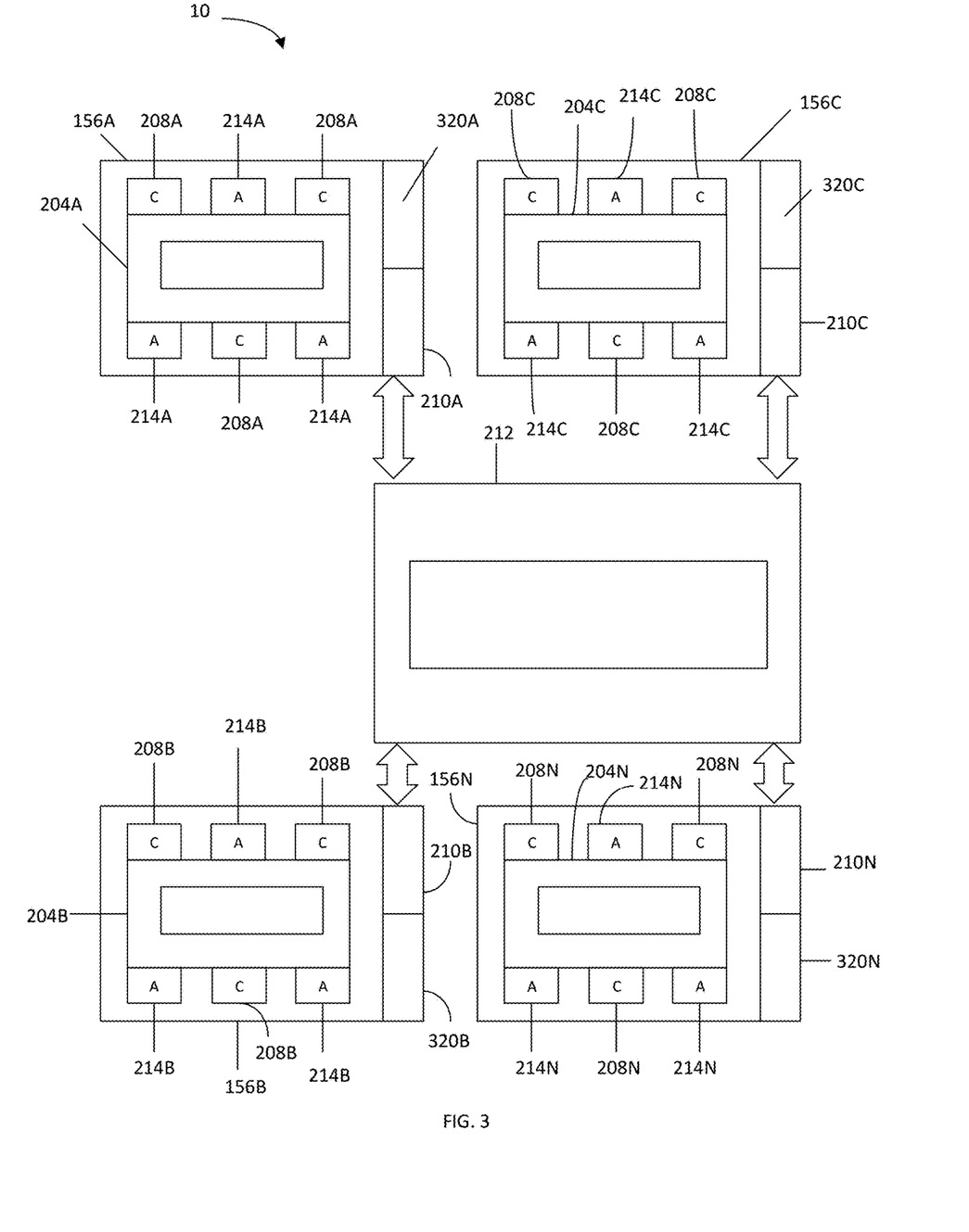
FIG. 3 is a simplified functional block diagram illustrating a computer system having a plurality of processors configured to process instructions, according to one or more embodiment of the present disclosure.
Figure 4:
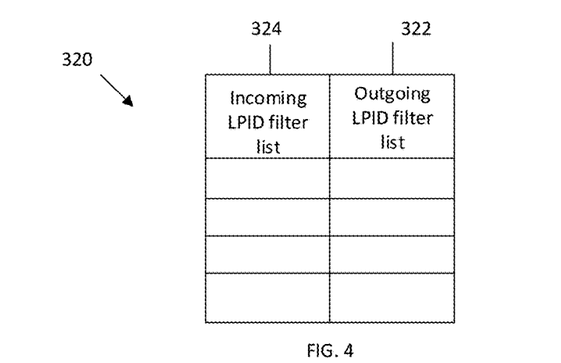
FIG. 4 is a simplified diagram showing a TLBie filter.

FIG. 3 illustrates an example of a simplified block diagram of an SMP system 10 having a plurality of processors (CMPs) 156 connected by cross-processor (or cross-chip) network adapters 210 to cross-processor (cross-chip) networks or fabric bus 212. Each processor (CMP) 156 includes one or more processor cores 208 and one or more accelerator units 214 interconnected by a communication processor (CMP) fabric 204. Each processor (CMP) 156 further includes a SMP interconnect or cross-processor link network adapter 210 to connect to the fabric bus (or cross-processor network) 212 that interconnects the plurality of processors 156. Each processor 156, and preferably each cross-processor link adapter 210 in each processor 156, has an address translation invalidation instruction, e.g., TLBie, filter 320. The address translation invalidation instruction, e.g., TLBie, filter 320 preferably has filters in both the outgoing and incoming direction associated with respective filter lists that contain logical partition identifications (LPIDs). The address translation invalidation filter 320 preferably associated with each processor 156 has an outgoing filter list 322 and an incoming filter list 324 as shown in FIG. 4.

The outgoing filter list 322 maintains a list of LPIDs that only exist inside the associated processor (on a thread or accelerator context) and no other processor (CMP) in the system. That is, the outgoing filter list 322 identifies and contains LPIDs that are exclusive to that processor (CMP). In operation, as explained below by examples of processing address translation buffer invalidation (e.g., TLBie) instructions, the LPID of the issuing, originating, and/or outgoing translation buffer invalidation, e.g., TLBie, instruction is checked against the outgoing filter list 322 and if it matches any of the LPIDs in the outgoing filter list 322 it is acknowledged by the translation buffer invalidation (TLBie) filter 320 on behalf of the rest of the system, e.g., on behalf of all the processors (CMPs), and the translation buffer invalidation (TLBie) instruction is not sent out on the cross-chip network 212.

Figure 5:
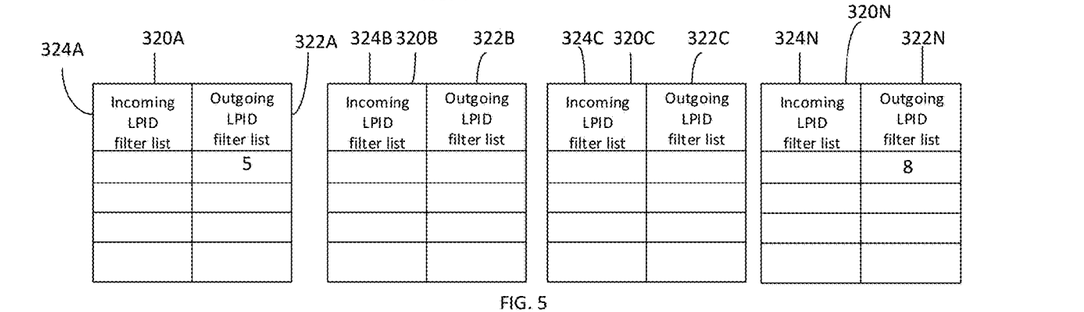
FIG. 5 is a simplified diagram showing TLBie filters for processing a TLBie instruction in processors of a system.

Using the block diagram of FIG. 3 as an example of a SMP system 10 where processors (CMPs) have a processor core 208 or accelerator unit 214 that executes hardware threads or work elements for different logical partitions, and in an example where processor 156A works a thread context LPID=5 and a work-element context LPID=5, and LPID=5 is not associated with, e.g., does not exist on, any other processor 156 in the SMP system 10, LPID=5 is included in the outgoing LPID filter list 322A in TLBie filter 320A for processor (CMP) 156A as shown in FIG. 5. Processors (CMPs) 156B and 156C as shown in FIG. 5 have empty TLBie filters 320B and 320C respectively, while CMP 156N with work element context LPID=8 has LPID=8 in its outgoing filter 322N.

In processing a TLBie instruction for LPID=5, the TLBie instruction is circulated on CMP fabric 204A to check the processor cores 208A and accelerator units 214A in processor (CMP) 156A. In addition, TLBie in processor (CMP) 156A having a LPID=5 would be checked against the LPIDs in the outgoing LPID filter list 322A in the TLBie filter 320A, and since the outgoing LPID filter list 322A has LPID=5, the TLBie filter 320A acknowledges the TLBie with LPID=5 on behalf of SMP (and each CMP). The TLBie filter 320A can acknowledge on behalf of the SMP system 10 because LPID=5 on the outgoing TLBie filter list 322A indicates that the logical partition associated with that thread resides only on processor (CMP) 156A and so no other processors (CMPs) in the SMP system 10 need to be checked.

Figure 6:
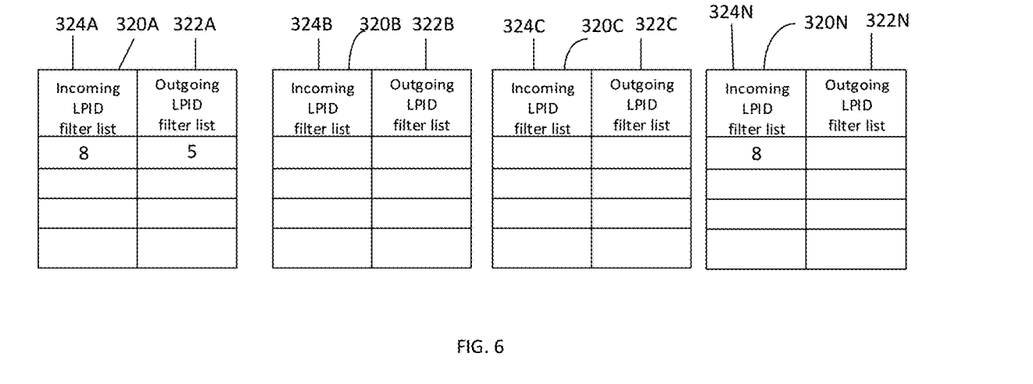
FIG. 6 is a simplified diagram showing TLBie filters for processing a TLBie instruction in processors of a system.

The incoming filter list 324 which is part of the TLBie filter 320 preferably associated with each processor (CMP) 156 tracks all LPIDs that exist in the system 10, i.e., in all the processors (CMPs) 156, and that exist on that particular processor (CMP). More particularly, the incoming filter list 324 contains all LPIDs on that processor (CMP), and that also exist on at least one other processor 156 in the system 10. So for example, in an example of the system 10 of FIG. 3, where LPIDs exist on, e.g. are assigned to, processor (CMP) 156A through processor (CMP) 156N, the TLBie filters 320A through 320N are as illustrated in FIG. 6 where TLBie filter 320A has LPID=8 in the incoming TLBie filter list 324A and LPID=5 in outgoing TLBie filter 322A indicating that LPID 5 is exclusive to processor (CMP) 156A, and that processor (CMP) 156A also has LPID 8. TLB filters 320B and 320C both have no entries in either filter lists 322B, 322C, 324B, or 324C indicating that no logical partitions have been assigned to processors (CMPs) 156B and 156C. TLBie filter 320N has LPID=8 in the incoming TLBie filter list 324N and nothing in outgoing TLBie filter 322N indicating that LPID 8 is assigned to CMP 156N and that LPID 8 is also on other processors (CMPs) in the system.

In the situation where a TLBie that has LPID=8 is processed in system 10 that is configured as in FIG. 3 and has LPIDs assigned to various processors (CMPs) as indicated by the filters 320 in FIG. 6, and the TLBie issues or originates, for example, in processor (CMP) 156A, the TLBie is processed internally within processors (CMPs) 156A and 156N while the TLBie filters 320B and 320C acknowledge on behalf of the entire respective processors (CMPs) 156B and 156C. More specifically, the TLBie with LPID=8 originating in processor (CMP) 156A is processed in processor (CMP) 156A where it originates (checks the processor cores 208A and accelerator units 214A). When processor (CMP) 156A completes its check (snooping) it acknowledges on behalf of processor (CMP) 156A. Since LPID=8 is not on the outgoing TLBie filter list 322A in processor 156A, the TLBie with LPID=8 is sent outside processor (CMP) 156A on fabric bus 212 to the other processors (CMPs) in the system. In the example of SMP system 10 of FIG. 3, the TLBie with LPID=8 is sent to processors (CMPs) 156B, 156C, and 156N. If the incoming TLBie with LPID=8 does not match any entry in the incoming TLBie filter list 324, as would happen in processor (CMPs) 156B and 156C, then the TLBie filter 320, e.g., filters 320B and 320C, acknowledges the request on behalf of the entire respective processors (CMPs) 156B and 156C.

If on the other hand, an incoming TLBie instruction, e.g., control packet, has a LPID field that matches any entry in the incoming LPID filter list 324, then and only then is that TLBie sent inside the processor (CMP) to the on-processor (CMP) fabric 204 for further snooping and completion. In the example of the system 10 of FIG. 3 processing a TLBie with LPID=8, the incoming LPID filter list 324N in processor 156N is checked and since the incoming filter list 324N has LPID=8, the TLBie instruction packet enters processor (CMP) 156N and is circulated on processor (CMP) fabric 204N to check for a match. When the snooping process of processor (CMP) 156N is complete, processor (CMP) 156N acknowledges the request.

The TLBie filter 320 in one or more embodiments is managed, monitored and updated by software. The hypervisor in one or more embodiments of a SMP system is already aware of the system configuration and can identify when a logical partition, e.g., LPID, is being scheduled on a hardware thread and where the hardware thread is located in the system. To support the hardware in the system, in one or more embodiments, the following or similar instructions can be used.

REMOVE_LOCAL_OUTGOING <LPID>: instruction removes the entry for the associated LPID in the outgoing filter list of the processor (CMP) on which it originated or issued, if it exists.

REMOVE_LOCAL_INCOMING <LPID>: instruction removes the entry for the associated LPID in the incoming filter list of the processor (CMP) on which it originated or issued, if it exists.

REMOVE_GLOBAL_OUTGOING <LPID>: this instruction would be sent to all processors (CMPs) in the system and in response to receiving this instruction the corresponding LPID is removed from its outgoing filter list, if it exists.

ADD_LOCAL_OUTGOING <LPID>: this instruction creates an entry for the associated LPID in the outgoing filter list of the processor (CMP) on which it originated or issued, if it does not already exist.

ADD_LOCAL_INCOMING <LPID>: this instruction creates an entry for the associated LPID in the incoming filter list of the processor (CMP) on which it originated or issued, if it does not already exist.

When a change of logical partition, e.g., LPID, is performed on a thread, in one or more embodiments, operations are performed to ensure the information on the system and in the translation buffer invalidation (TLBie) filter is correct. If the old LPID on that thread was the last LPID in existence in the system, then the old LPID on the outing filter list on the processor (CMP) on which that old LPID originated is removed, and the old LPID on the incoming filter list of the processor (CMP) on which that old LPID originated is removed. If the old LPID in that thread was the last one in existence for its partition in the processor (CMP), but not the overall system, then remove the old LPID on the incoming filter list for that processor (CMP).

If a new LPID does not exist anywhere in the system, then an entry is created for the associated LPID in the outgoing filter list of the processor (CMP) on which it originated or issued, and an entry is created for the associated LPID in the incoming filter list of the processor (CMP) on which the LPID originated. If the new LPID exists in the system but no thread with that LPID exists in that processor (CMP), then an entry is created for the associated LPID in the incoming filter list on that processor (CMP). If the hypervisor is aware that a new LPID in the thread is already scheduled on another processor (CMP) other than this thread's processor (CMP), then an instruction is sent out to all the processors (CMPs) in the system that removes the corresponding LPID from its outgoing filter list, and an entry for the associated LPID is created on the incoming filter list of the processor (CMP) on which the LPID originated or issued.

Disclosed is system and/or process to reduce processing effort of a translation buffer invalidation (TLBie) instruction in a computer SMP network system, which results in higher throughput and less latency in the processing of translation buffer invalidation (e.g., TLBie) instructions. In one or more other embodiments, the process of removing address translations from a translation buffer has been explained with reference to TLBs and TLBie instructions in a system. It should be appreciated that the same and/or similar process would be applicable to processing and/or removing other translations in other translation buffers. For example, in one or more embodiment, a SLB invalidate entry (SLBie) instruction in a system can be processed in the same or similar manner to the cases in which an invalidation operation is applied to an address translation in a TLB. In yet one or more other embodiments, an IUSB invalidate entry (IUSBie) instruction in the system can be processed in the same or similar manner to cases in which an invalidation operation is applied to an address translation in a TLB. The disclosure describes an example in which a TLBie instruction is processed to invalidate translations in TLB caches; however, it is noted the features and functions within the TLBie instruction example are equally applicable to embodiments in which a SLBie instruction and/or an IUSBie instruction is processed to invalidate translations in storage (memory) locations.

Figure 7:
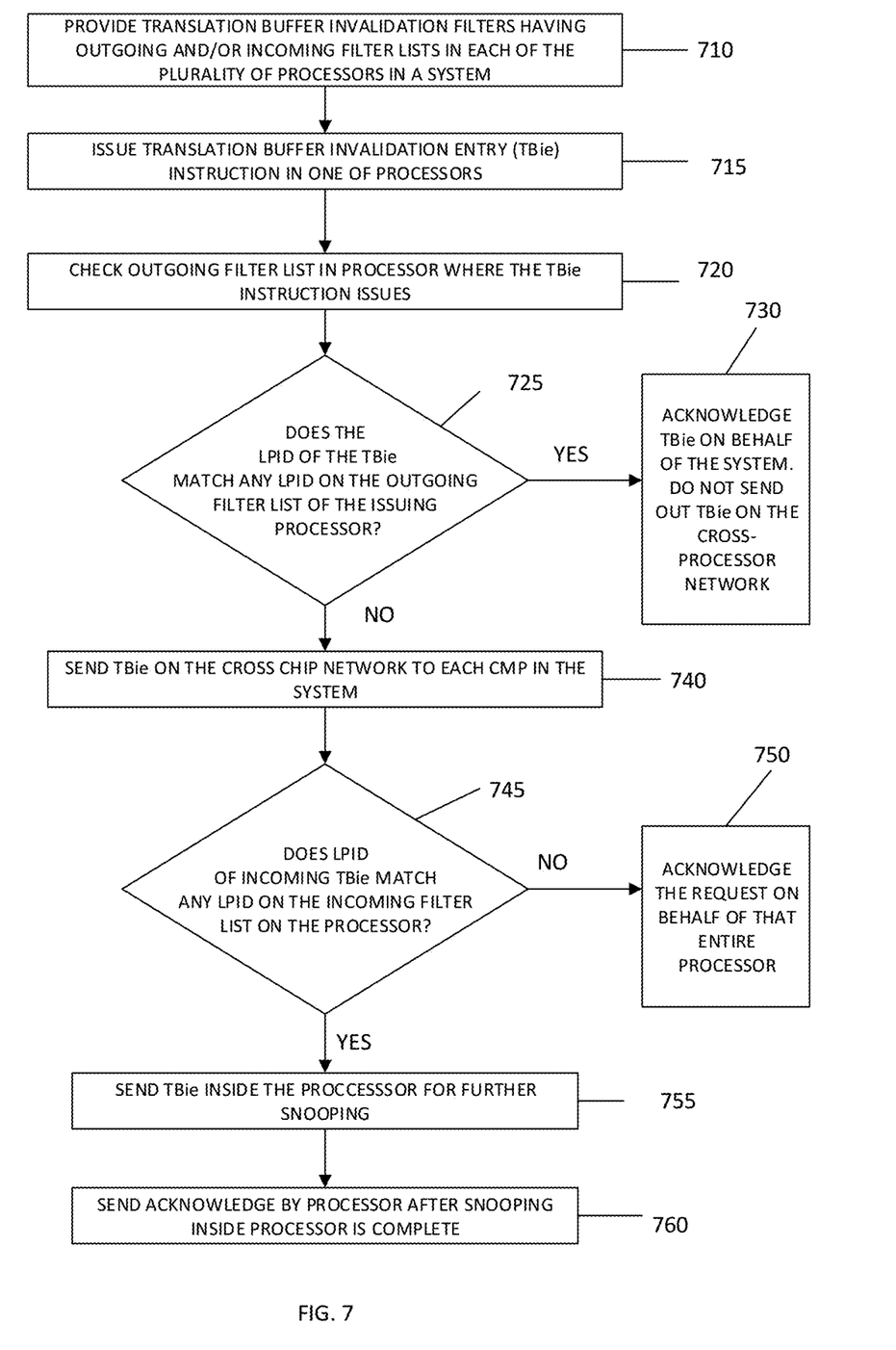
FIG. 7 is a flowchart illustrating a method of processing an instruction to remove a translation in one or more translation buffers in a system.

FIG. 7 is an exemplary flowchart in accordance with various embodiments illustrating and describing a method of removing and/or changing address translations, e.g., processing an address translation buffer invalidation (e.g.,TLBie) instruction, within a computer system to improve performance, according to one or more embodiments of the present disclosure. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order.

Method 700 illustrated in the flowchart of FIG. 7 is directed to removing and or changing address translations in translation buffers in a system having a plurality of processors or CMPs. In one or more embodiments, process 700 includes processing a translation buffer invalidation entry (TBie) instruction, e.g., a TLBie, a SLBie, an IUSBie, in a system having a plurality of interconnected multi-processors. The method 700 will be described by reference to processing and removing a translation mapping in a translation buffer, such as for example a translation look-aside buffer (TLB) or a segment look-aside buffer (SLB), but it should be appreciated that the method, processor, and system can have other applications and configurations.

In one or more embodiments, at 710, a filter construct is provided in the system, and preferably a filter construct is associated with and/or contained in each of the plurality of processors or CMPs in the system. In an embodiment, each processor or CMP can include a plurality of processor cores and/or accelerator units that are preferably interconnected by a CMP (processor) communication fabric. The filter construct is preferably a directory structure that is managed by software. In one or more embodiments, the filter construct has an outgoing filter list that identifies the logical partition identifications (LPIDs) that are exclusive to that processor, e.g., CMP. In one or more embodiments, the filter construct, additionally and/or alternatively has an incoming filter list that identifies all LPIDs that are on that processor, e.g., CMP, and are also on at least one other processor (CMP) in the system. In an embodiment, the outgoing and incoming filter lists are preferably managed and updated by software.

In an embodiment, at 715, a translation buffer invalidation entry (TBie) instruction, e.g., TLBie, SLBie, and/or IUSBie, is issued in a processor (CMP), and is processed in the processor (CMP) where the invalidation instruction issues or originates. In an aspect, the address translation invalidation instruction is circulated on the CMP communication fabric to the various processor cores and acceleration units in the processor or CMP. In response to completing the snooping process within the processor (CMP) where the translation buffer invalidation instruction issued, that processor or CMP acknowledges the request. In an embodiment, acknowledging the request refers to that part of the system, e.g., that processor or CMP, that saw and processed the request. In an aspect, the request can be acknowledged where one or more matching translations have been located and removed (or changed) from one or more address translation buffers in the processor (CMP) and/or where no matching translation is found in the processor (CMP).

In one or more embodiments of practicing the method 700, at 720 the outgoing filter list of the processor (CMP) where the invalidation instruction issued or originated is checked for an LPID that matches the LPID of the translation buffer invalidation instruction. If at 725 the LPID of the TBie instruction matches any LPID entries in the outgoing filter (725: YES), then at 730 the processor (CMP) acknowledges the translation buffer invalidation instruction on behalf of the entire system, e.g., all of the processors (CMPs) in the system. The TBie instruction is not sent out on the cross-processor (cross-chip) network or network fabric bus if the LPID of the TBie instruction matches an entry on the outgoing filter list for that processor (CMP). On the other hand, if the LPID of the TBie instruction does not match any LPID on the outgoing filter list (725: NO), then at 740 the TBie instruction is sent out to each processor (CMP) in the system. For example, the TLBie instruction is sent out on the cross-processor network to each processor (CMP).

Where the translation buffer invalidation entry (TBie) instruction is sent out to each processor (CMP) and processed, at each processor (CMP) the filter construct is checked, and more specifically the incoming filter list is checked at 745 to determine whether the LPID of the incoming TBie instruction matches any LPID on the incoming filter list for that respective processor. If the incoming LPID of the TBie instruction does not match any LPID on the incoming filter list (745: NO), then the request is acknowledged at 750 on behalf of the entire processor (CMP), and in an embodiment, the translation buffer filter construct acknowledges the request on behalf of that entire processor (CMP).

If the LPID of the TBie instruction matches any LPID on the incoming filter list in the processor or CMP (745: YES), then at 755 the TBie instruction is sent inside the processor (CMP) for further snooping, e.g., for further processing and checking in the processor (CMP) for matching address translation entries in translation buffers that are to be removed from and or changed in the address translation buffer. In one or more embodiments, the TBie instruction is sent into the processor (CMP) and circulated on the CMP fabric for further snooping. At 760, when the snooping process inside the processor (CMP) is complete, the processor (CMP) acknowledges the request.

Various illustrative aspects described above are preferably implemented in hardware, such as in units and circuitry of a processor, and various aspects of the illustrative embodiments may be implemented in software. For example, it will be understood that each block of the flowchart illustrations in FIG. 7, and combinations of blocks in the flowchart illustration, can be implemented by hardware or computer program instructions. These computer program instructions may be provided to a processor or other programmable data processing apparatus to produce a machine, such that the instructions, which execute on the processor or other programmable data processing apparatus, create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer or processing systems which perform the specified functions or steps, or by combinations of special purpose hardware and/or computer instructions.

In one or more embodiments, an information handling system having a plurality of processors connected by a cross-processor network is disclosed where each of the plurality of processors include one or more address translation buffers, each address translation buffer having a plurality of address translation entries containing address translation information; a filter construct having an outgoing filter list that identifies logical partition identifications (LPIDs) that are exclusively assigned to that processor. In one or more embodiments the system in operation is designed and configured to: issue an address translation invalidation instruction having a LPID in one of the plurality of processors in the processing system; check the outgoing filter list in the processor where the address translation invalidation instruction issued; determine whether the LPID of the address translation invalidation instruction matches any of the LPIDs in the outgoing filter list; and acknowledge, in at least partial response to the LPID of the address translation invalidation instruction matching any of the LPIDs in the outgoing filter list, the translation instruction invalidation instruction on behalf of the system.

The filter construct in one or more embodiments further has an incoming filter list that identifies the LPIDs assigned to that processor and at least one other processor in the system, and the system in operation in an aspect is further designed and configured to: determine, for each of the plurality of processors in the system other than the processor where the address translation invalidation instruction issued, whether the LPID of the address translation invalidation instruction matches any of the LPIDs in the respective processor incoming filter list; and send, in response to the LPID of the address translation invalidation instruction matching any of the LPIDs in the incoming filter list, the address translation invalidation instruction into that processor. The system in operation in an embodiment is further designed and configured to: check, within the translation buffers in the processor where the LPID of the address translation invalidation instruction matches a LPID in the incoming filter list, for address translation entries that correspond to the address translation invalidation instruction; and acknowledge, in response to completing the check within each processor that has a LPID in their incoming filter list that matches the LPID of the address translation invalidation instruction, the address translation invalidation instruction on behalf of the respective processor. The system in operation is further designed and configured to: acknowledge, in response to the LPID of the address translation invalidation instruction not matching any of the LPIDs in the incoming filter list, the address translation invalidation instruction on behalf of the respective processor. In yet a further embodiment, the system in operation is further designed and configured to: check, within the translation buffers in the processor where the LPID of the address translation invalidation instruction matches a LPID in the incoming filter list, for address translation entries that correspond to the address translation invalidation instruction;

acknowledge, in response to completing the check within each processor that has a LPID in their incoming filter list that matches the LPID of the address translation invalidation instruction, the address translation invalidation instruction on behalf of the respective processor; and acknowledge, in response to the LPID of the address translation invalidation instruction not matching any of the LPIDs in the incoming filter list, the address translation invalidation instruction on behalf of the respective processor.

In one or more embodiments, an information handling system having a plurality of processors connected by a cross-processor network is disclosed, where each of the plurality of processors includes one or more address translation buffers, each address translation buffer having a plurality of entries containing address translation information; and a filter construct having an incoming filter that identifies logical partition identifications (LPIDs) assigned to that processor and at least one other processor in the system. The system in operation is designed and configured in an embodiment to: issue an address translation invalidation instruction in one of the plurality of processors in the processing system; send the address translation invalidation instruction out of the processor where the address translation invalidation instruction issued to the other processors in the system; determine, for each of the processors in the system other than the processor where the address translation invalidation instruction issued, whether the LPID of the address translation invalidation instruction matches any of the LPIDs in the respective processor incoming filter list; and send, in response to the LPID of the address translation invalidation instruction matching any of the LPIDs in the incoming filter list, the address translation invalidation instruction into the processor that has the incoming filter with the LPID that matches the LPID on the incoming filter list. The system in operation is further designed and configured in an aspect to: check, within the translation buffers in the processor where the LPID of the address translation invalidation instruction matches a LPID on the incoming filter, for address translation entries that correspond to the address translation invalidation instruction; and acknowledge, in response to completing the check within each processor that has a LPID in their incoming filter that matches the LPID of the address translation invalidation instruction, the address translation invalidation instruction on behalf of the respective processor. The system in operation is further designed and configured in an embodiment to acknowledge, in response to the LPID of the address translation invalidation instruction not matching any of the LPIDs in the incoming filter list, the address translation invalidation instruction on behalf of the respective processor. The system in operation is further designed and configured according to an aspect to check within the one or more translation buffers in the processor where the address translation invalidation instruction issues for address translations entries that correspond to the address translation invalidation instruction, and acknowledge, in response to completing the check within the issuing processor, the address translation invalidation instruction on behalf of the issuing processor. The filter construct in an embodiment optionally has an outgoing filter that maintains a list of LPIDs that are exclusively assigned to that processor, and the system in operation is further designed and configured to: check the outgoing filter list in the processor where the address translation invalidation instruction issued; determine whether the LPID of the address translation invalidation instruction matches any of the LPIDs in the outgoing filter list; and acknowledge, in at least partial response to the LPID of the address translation invalidation instruction matching any of the LPIDs in the outgoing filter list, the translation instruction invalidation instruction on behalf of the system. The system in operation is further designed and configured in an aspect to send, in response to the LPID of the address translation invalidation instruction not matching any of the LPIDs in the outgoing filter, the address translation invalidation instruction out of the processor where the address translation invalidation instruction issued to the other processors in the system.

The information handling system in an embodiment in operation is further designed and configured to check within the one or more address translation buffers in the processor where the address translation invalidation instruction issues for address translation entries that correspond to the address translation invalidation instruction. In an aspect, the system in operation is further designed and configured to send, in response to the LPID of the address translation invalidation instruction not matching any of the LPIDs in the outgoing filter, the address translation invalidation instruction out of the processor where the address translation invalidation instruction issued to the other processors in the system. And according to an embodiment, the system in operation is further designed and configured to circulate the address translation invalidation instruction on the cross-processor network to send the address translation invalidation instruction to the processors in the system other than the processor where the address translation invalidation instruction issued. The outgoing and incoming filter lists in one or more embodiments are designed and configured to be updated and maintained using software. The filter construct in an embodiment is on a network adapter that connects each of the processors to the cross-processor network.

In one or more embodiments, a method of processing information in a processing system having a plurality of processors is disclosed, more particularly a method of removing or changing address translations in address translation buffers or caches that are preferably local to at least one of the plurality of processors in the system. The processors preferably have one or more address translation buffers or caches of address translations, and in one or more embodiments includes one or more different types of address translation buffers. The method includes in one or more embodiments issuing an address translation invalidation instruction in one of the plurality of processors in the processing system; providing an outgoing filter list that maintains a list of logical partition identifications (LPIDs) that are exclusive to the processor that contains the outgoing filter list; determining whether the LPID of the address translation invalidation instruction matches any of the LPIDs in the outgoing filter list of the processor where the address translation invalidation instruction issued; and acknowledging, in at least partial response to the LPID of the address translation invalidation instruction matching any of the LPIDs in the outgoing filter list, the translation instruction invalidation instruction on behalf of the system. The method in an aspect further includes checking within the processor where the address translation invalidation instruction issues for address translations that correspond to the address translation invalidation instruction. The method in one or more aspects includes sending, in response to the LPID of the address translation invalidation instruction not matching any of the LPIDs in the outgoing filter, the address translation invalidation instruction out of the processor where the address translation invalidation instruction issued to the other processors in the system.

The method in one or more embodiments preferably includes circulating the address translation invalidation instruction on a cross-processor network to send the address translation to the processors in the system other than the processor where the address translation invalidation instruction issued; and in an aspect further providing an incoming filter list on each of the plurality of processors, wherein the incoming filter identifies LPIDs assigned to the respective processor and at least one other processor in the system; determining, for each of the processors in the system other than the processor where the address translation invalidation instruction issued, whether the LPID of the address translation invalidation instruction matches any of the LPIDs in the incoming filter list; and sending, in response to the LPID of the address translation invalidation instruction matching any of the LPIDs in the incoming filter list, the address translation invalidation instruction into the respective processor. According to an embodiment, the method preferably also includes checking the address translation invalidation instruction, in response to the LPID of the address translation invalidation instruction matching any of the LPIDs in the incoming filter, within the processors; and acknowledging, in response to completing the check within the processors that have a LPID on their incoming filter that matches the LPID of the address translation invalidation instruction, the address translation invalidation instruction on behalf of the respective processor. In another aspect, the method further includes acknowledging, in response to the LPID of the address translation invalidation instruction not matching any of the LPIDs in the incoming filter list, the address translation invalidation instruction on behalf of the respective processor.

Also disclosed is a method of processing information in a processing system having a plurality of processors that includes issuing an address translation invalidation instruction in one of the plurality of processors in the processing system; sending the address translation invalidation instruction out of the processor where the address translation invalidation instruction issued to the other processors in the system; providing an incoming filter list that maintains a list of logical partition identifications (LPIDs) assigned to that processor and at least one other processor in the system; determining, for each of the processors in the system other than the processor where the address translation invalidation instruction issued, whether the LPID of the address translation invalidation instruction matches any of the LPIDs in the incoming filter list; and sending, in response to the LPID of the address translation invalidation instruction matching any of the LPIDs in the incoming filter list, the address translation invalidation instruction into the processor that has the incoming filter with the LPID that matches the LPID on the incoming filter list. The method further comprises in an embodiment checking the address translation invalidation instruction within the processors that have an LPID on their incoming filter that matches the LPID of the address translation invalidation instruction; and acknowledging, in response to completing the check within the processors that have a matching LPID on their incoming filter that matches the LPID of the address translation invalidation instruction, the address translation invalidation instruction on behalf of the respective processor.

Also disclosed is a method of processing information in a processing system having a plurality of processors that includes issuing an address translation invalidation instruction in one of the plurality of processors in the processing system; sending the address translation invalidation instruction out of the processor where the address translation invalidation instruction issued to the other processors in the system; providing an incoming filter list in one or more processors, preferably all the processors in the system, where the incoming filter list maintains and/or identifies a list of logical partition identifications (LPIDs) assigned to both that processor and at least one other processor in the system; determining, for each of the processors in the system other than the processor where the address translation invalidation instruction issued, whether the LPID of the address translation invalidation instruction matches any of the LPIDs in the incoming filter list; and acknowledging, in response to the LPID of the address translation invalidation instruction not matching any of the LPIDs in the incoming filter list, the address translation invalidation instruction on behalf of that respective processor.

The method, in an aspect of using an incoming filter, also optionally includes providing an outgoing filter list that maintains a list of logical partitions identifications (LPIDs) exclusively assigned to that processor with the outgoing filter list; checking the outgoing filter list in the processor where the address translation invalidation instruction issued or originated; determining whether the LPID of the address translation invalidation instruction matches any of the LPIDs in the outgoing filter list; and acknowledging the translation instruction invalidation instruction on behalf of the system in at least partial response to the LPID of the address translation invalidation instruction matching any of the LPIDs in the outgoing filter list.

The method in an embodiment also includes maintaining and updating the outgoing and incoming filter lists using software. The method in an aspect has the outgoing filter list and the incoming filter list as part of a filter construct on a network adapter in each of the plurality of processors in the system.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of handling information in an information handling system having a plurality of processors connected by a cross-processor network, the method comprising:
   issuing an address translation invalidation instruction having a logical partition identification (LPID) in one of the plurality of processors in the processing system;
   checking an outgoing filter list in the processor where the address translation invalidation instruction issued, wherein the outgoing filter list identifies LPIDS that are exclusively assigned to that processor;
   determining whether the LPID of the address translation invalidation instruction matches any of the LPIDs in the outgoing filter list; and
   acknowledging, in at least partial response to the LPID of the address translation invalidation instruction matching any of the LPIDs in the outgoing filter list, the translation instruction invalidation instruction on behalf of the system.

2. The method of claim 1, further comprising:
   checking within the one or more translation buffers in the processor where the address translation invalidation instruction issues for address translation entries that correspond to the address translation invalidation instruction.

3. The method of claim 1, further comprising:
   sending, in response to the LPID of the address translation invalidation instruction not matching any of the LPIDs in the outgoing filter, the address translation invalidation instruction out of the processor where the address translation invalidation instruction issued to the other processors in the system.

4. The method of claim 1, further comprising:
   circulating the address translation invalidation instruction on the cross-processor network to send the address translation invalidation instruction to the processors in the system other than the processor where the address translation invalidation instruction issued.

5. The method of claim 1, wherein each processor comprises a filter construct having the outgoing filter list and an incoming filter list that identifies the LPIDs assigned to that processor and at least one other processor in the system, the method further comprising:
   determining, for each of the plurality of processors in the system other than the processor where the address translation invalidation instruction issued, whether the LPID of the address translation invalidation instruction matches any of the LPIDs in the respective processor incoming filter list; and
   sending, in response to the LPID of the address translation invalidation instruction matching any of the LPIDs in the incoming filter list, the address translation invalidation instruction into that processor.

6. The method of claim 5, further comprising:
   checking, within a translation buffer in the processor where the LPID of the address translation invalidation instruction matches a LPID in the incoming filter list, for address translation entries that correspond to the address translation invalidation instruction; and
   acknowledging, in response to completing the check within each processor that has a LPID in their incoming filter list that matches the LPID of the address translation invalidation instruction, the address translation invalidation instruction on behalf of the respective processor.

7. The method of claim 5, further comprising:
   acknowledging, in response to the LPID of the address translation invalidation instruction not matching any of the LPIDs in the incoming filter list, the address translation invalidation instruction on behalf of the respective processor.

8. The method of claim 5, further comprising:
   checking, within a translation buffer in the processor where the LPID of the address translation invalidation instruction matches a LPID in the incoming filter list, for address translation entries that correspond to the address translation invalidation instruction;
   acknowledging, in response to completing the check within each processor that has a LPID in their incoming filter list that matches the LPID of the address translation invalidation instruction, the address translation invalidation instruction on behalf of the respective processor;
   acknowledging, in response to the LPID of the address translation invalidation instruction not matching any of the LPIDs in the incoming filter list, the address translation invalidation instruction on behalf of the respective processor.

9. The method of claim 5, further comprising updating and maintaining the outgoing and incoming filter lists using software.

10. The method of claim 5, wherein the filter construct is on a network adapter that connects each of the processors to the cross-processor network.

11. A method of handling information in a system having a plurality of processors connected by a cross-processor network, the method comprising:
   issuing an address translation invalidation instruction in one of the plurality of processors in the processing system;
   sending the address translation invalidation instruction out of the processor where the address translation invalidation instruction issued to the other processors in the system;
   determining, for each of the processors in the system other than the processor where the address translation invalidation instruction issued, whether the logical partition identification (LPID) of the address translation invalidation instruction matches any of the LPIDs in an incoming filter list of the respective processor, wherein the incoming filter list identifies LPIDs assigned to that processor and at least one other processor in the system; and sending, in response to the LPID of the address translation invalidation instruction matching any of the LPIDs in the incoming filter list, the address translation invalidation instruction into the processor that has the matching LPID on the incoming filter list.

12. The method of claim 11, further comprising:
checking, within a translation buffer in the processor where the LPID of the address translation invalidation instruction matches a LPID on the incoming filter list, for address translation entries that correspond to the address translation invalidation instruction; and
acknowledging, in response to completing the check within each processor that has a LPID in their incoming filter list that matches the LPID of the address translation invalidation instruction, the address translation invalidation instruction on behalf of the respective processor.

13. The method of claim 11, further comprising:
acknowledging, in response to the LPID of the address translation invalidation instruction not matching any of the LPIDs in the incoming filter list, the address translation invalidation instruction on behalf of the respective processor.

14. The method of claim 11, further comprising:
checking, within a translation buffers in the processor where the LPID of the address translation invalidation instruction matches a LPID in the incoming filter list, for address translation entries that correspond to the address translation invalidation instruction;
acknowledging, in response to completing the check within each processor that has a LPID in their incoming filter list that matches the LPID of the address translation invalidation instruction, the address translation invalidation instruction on behalf of the respective processor;
acknowledging, in response to the LPID of the address translation invalidation instruction not matching any of the LPIDs in the incoming filter list, the address translation invalidation instruction on behalf of the respective processor.

15. The method of claim 11, further comprising:
checking within one or more translation buffers in the processor where the address translation invalidation instruction issues for address translations entries that correspond to the address translation invalidation instruction; and
acknowledging, in response to completing the check within the issuing processor, the address translation invalidation instruction on behalf of the issuing processor.

16. The method of claim 11, wherein each processor has a filter construct having the incoming filter list and an outgoing filter that maintains a list of LPIDs that are exclusively assigned to that processor, the method comprising:
determining whether the LPID of the address translation invalidation instruction matches any of the LPIDs in the outgoing filter list; and
acknowledging, in at least partial response to the LPID of the address translation invalidation instruction matching any of the LPIDs in the outgoing filter list, the translation instruction invalidation instruction on behalf of the system.

17. The method of claim 16, further comprising:
sending, in response to the LPID of the address translation invalidation instruction not matching any of the LPIDs in the outgoing filter, the address translation invalidation instruction out of the processor where the address translation invalidation instruction issued to the other processors in the system.

18. The method of claim 16, further comprising:
circulating the address translation invalidation instruction on the cross-processor network to send the address translation invalidation instruction to the processors in the system other than the processor where the address translation invalidation instruction issued.

19. The method of claim 11, further comprising updating and maintaining the incoming filter list using software.

20. The method of claim 16, wherein the filter construct is on a network adapter that connects each of the processors to the cross-processor network, the method further comprising updating and maintaining the outgoing filter list using software.

* * * * *